(12) United States Patent
Mori

(10) Patent No.: US 7,395,142 B2
(45) Date of Patent: Jul. 1, 2008

(54) COUNTER STEER DETECTING METHOD

(75) Inventor: Atsushi Mori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 30 days.

(21) Appl. No.: 11/206,172

(22) Filed: Aug. 18, 2005

(65) Prior Publication Data

US 2006/0041357 A1    Feb. 23, 2006

(30) Foreign Application Priority Data

Aug. 20, 2004   (JP) ............................. 2004-240254

(51) Int. Cl.
*B62D 5/04* (2006.01)
*B62D 6/00* (2006.01)

(52) U.S. Cl. ..................... 701/42; 180/443; 180/446

(58) Field of Classification Search ............. 701/41–42; 180/443–446
See application file for complete search history.

(56) References Cited

U.S. PATENT DOCUMENTS

| | | | |
|---|---|---|---|
| 4,704,541 A | | 11/1987 | Leiber |
| 4,809,173 A | * | 2/1989 | Fukami et al. ................. 701/43 |
| 4,881,611 A | * | 11/1989 | Nakashima et al. ......... 180/404 |
| 5,177,681 A | * | 1/1993 | Sato ............................. 701/38 |
| 5,251,135 A | * | 10/1993 | Serizawa et al. ............. 701/42 |
| 5,347,458 A | * | 9/1994 | Serizawa et al. ............. 701/41 |
| 5,366,059 A | * | 11/1994 | Demong ...................... 198/303 |
| 5,379,222 A | * | 1/1995 | Anan et al. ................... 701/91 |
| 5,446,657 A | * | 8/1995 | Ikeda et al. ................... 701/41 |
| 5,448,481 A | * | 9/1995 | Asanuma et al. ............. 701/42 |
| 5,482,133 A | * | 1/1996 | Iwata et al. ................. 180/197 |
| 5,503,244 A | * | 4/1996 | Beirlein ...................... 180/219 |
| 5,513,720 A | * | 5/1996 | Yamamoto et al. .......... 180/421 |
| 5,627,756 A | * | 5/1997 | Fukada et al. ................. 701/70 |
| 5,667,033 A | * | 9/1997 | Shimizu et al. ............. 180/272 |
| 5,729,107 A | * | 3/1998 | Shimizu et al. ............. 318/489 |
| 5,907,277 A | * | 5/1999 | Tokunaga .................... 340/441 |
| 6,047,229 A | * | 4/2000 | Ishikawa ...................... 701/50 |
| 6,064,930 A | * | 5/2000 | Shibahata .................... 701/36 |
| 6,101,435 A | * | 8/2000 | Baughn et al. ................ 701/41 |
| 6,208,929 B1 | * | 3/2001 | Matsuno et al. ............... 701/89 |
| 6,216,079 B1 | * | 4/2001 | Matsuda ...................... 701/70 |
| 6,226,587 B1 | * | 5/2001 | Tachihata et al. ............. 701/72 |
| 6,266,594 B1 | * | 7/2001 | Ishikawa ...................... 701/50 |
| 6,292,094 B1 | * | 9/2001 | Deng et al. .................. 340/431 |
| 6,374,162 B1 | * | 4/2002 | Tanaka et al. .................. 701/1 |

(Continued)

FOREIGN PATENT DOCUMENTS

DE       102 22 231 A1    12/2003

(Continued)

*Primary Examiner*—Jack W Keith
*Assistant Examiner*—Ari M Diacou
(74) *Attorney, Agent, or Firm*—Westerman, Hattori, Daniels & Adrian, LLP.

(57) ABSTRACT

The counter steer detecting method includes the steps of detecting a steering angle by a steering angle sensor, detecting a lateral acceleration by a lateral acceleration sensor, and determining counter steer according to the steering angle detected by the steering angle sensor and the lateral acceleration detected by the lateral acceleration sensor on the basis of a counter steer determination area table indicating whether or not the counter steer is on in relation to the combination of steering angle and lateral acceleration.

3 Claims, 7 Drawing Sheets

U.S. PATENT DOCUMENTS

| | | | |
|---|---|---|---|
| 6,397,127 B1* | 5/2002 | Meyers et al. | 701/1 |
| 6,397,135 B1* | 5/2002 | Akita | 701/41 |
| 6,405,113 B1* | 6/2002 | Yamawaki et al. | 701/41 |
| 6,409,287 B1* | 6/2002 | Leach et al. | 303/146 |
| 6,415,215 B1* | 7/2002 | Nishizaki et al. | 701/70 |
| 6,438,474 B1* | 8/2002 | Tanaka et al. | 701/41 |
| 6,470,994 B1* | 10/2002 | Shimizu et al. | 180/446 |
| 6,584,397 B2* | 6/2003 | Tanaka et al. | 701/70 |
| 6,594,569 B2* | 7/2003 | Yasuda | 701/41 |
| 6,622,073 B2* | 9/2003 | Tanaka et al. | 701/38 |
| 6,626,563 B2* | 9/2003 | Nishimura et al. | 362/465 |
| 6,685,277 B1* | 2/2004 | Kohlmorgen et al. | 303/3 |
| 6,697,728 B2* | 2/2004 | Kin et al. | 701/70 |
| 6,736,236 B2* | 5/2004 | Kurishige et al. | 180/446 |
| 6,789,008 B2* | 9/2004 | Kato et al. | 701/41 |
| 7,165,646 B2* | 1/2007 | Kifuku et al. | 180/446 |
| 7,325,644 B2* | 2/2008 | Sakai | 180/402 |
| 2002/0026270 A1* | 2/2002 | Kurishige et al. | 701/41 |
| 2002/0039296 A1* | 4/2002 | Nishimura et al. | 362/465 |
| 2002/0087247 A1* | 7/2002 | Tanaka et al. | 701/70 |
| 2002/0125063 A1* | 9/2002 | Kurishige et al. | 180/443 |
| 2003/0028306 A1* | 2/2003 | Fujimori | 701/41 |
| 2003/0074123 A1* | 4/2003 | Kin et al. | 701/70 |
| 2003/0114270 A1* | 6/2003 | Wuertz et al. | 477/111 |
| 2003/0213640 A1* | 11/2003 | Kato et al. | 180/446 |
| 2003/0221898 A1* | 12/2003 | Yasui et al. | 180/446 |
| 2004/0064228 A1* | 4/2004 | Yamamoto et al. | 701/41 |
| 2004/0079578 A1* | 4/2004 | Kurishige et al. | 180/446 |
| 2004/0148076 A1* | 7/2004 | Kodama et al. | 701/41 |
| 2006/0076182 A1* | 4/2006 | Kifuku et al. | 180/446 |
| 2007/0294009 A1* | 12/2007 | Yasui et al. | 701/41 |

FOREIGN PATENT DOCUMENTS

| | | |
|---|---|---|
| JP | 4-201726 | 7/1992 |
| JP | 2002-96652 | 4/2002 |
| JP | 2002096652 | 4/2002 |
| JP | 2003-182622 A | 7/2003 |

* cited by examiner

COUNTER STEER DETECTING METHOD

BACKGROUND OF THE INVENTION

1. Field of the Invention

The present invention relates to a counter steer detecting method, and more particularly to a method of detecting counter steer accurately and early.

2. Description of the Related Art

The turning performance of a vehicle can be improved by providing a differential for controlling the difference in torque between right and left drive wheels. However, when one of the right and left drive wheels slips, torque distribution to the drive wheels by the differential is not performed. Accordingly, it is necessary to control the torque distribution according to a running condition of the vehicle. In a four-wheel drive vehicle, the difference in torque between front and rear wheels is controlled to improve both the turning performance and the running stability of the vehicle.

In general, when the differential action of a differential is limited, the running stability is improved, whereas when the differential action is not limited, the turning performance is improved. In the case that counter steer occurs in drift running or the like, the differential action is locked to thereby improve the running stability. Accordingly, the determination of counter steer is required to properly operate the differential and thereby to perform optimum torque distribution.

Conventional counter steer determining methods are disclosed in Japanese Patent NoS. 4-201726 and 2002-96652. The method disclosed in Japanese Patent No. 4-201726 is that the counter steer is determined when the direction of turn of a vehicle obtained from a lateral acceleration (which will be hereinafter referred to also as lateral G) detected by lateral G detecting means is different from the direction of steer detected by steering angle detecting means, that is, when the sign of the lateral G is different from the sign of the steering angle. On the other hand, the method disclosed in Japanese Patent No. 2002-96652 is that the counter steer is detected according to the magnitude of an actual lateral G detected by a lateral G sensor and the magnitude of a calculated lateral G.

The method disclosed in Japanese Patent NO. 4-201726 has the following problems. First, until the direction of steer becomes opposite to the direction of turn of the vehicle, the counter steer cannot be detected, so that the detection of the counter steer is delayed. Secondly, the sign of the steering angle becomes momentarily different from the sign of the lateral G because of delay characteristics of the vehicle and the lateral G sensor in slalom running or the like, and the counter steer is improperly determined in spite of the above case where no counter steer occurs.

The method disclosed in Japanese Patent No. 2002-96652 has the following problems. First, since the counter steer is detected according to the magnitude of the actual lateral G detected by the lateral G sensor and the magnitude of the calculated lateral G, it is difficult to determine the correlation between the counter steer and the magnitudes of the actual lateral G and the calculated lateral G, so that accurate detection of the counter steer is difficult. Secondly, until the direction of steer becomes opposite to the direction of turn of the vehicle, the counter steer cannot be detected, so that the detection of the counter steer is delayed.

SUMMARY OF THE INVENTION

It is therefore an object of the present invention to provide a counter steer detecting method which can detect counter steer accurately and easily.

In accordance with an aspect of the present invention, there is provided a counter steer detecting method including the steps of detecting a steering angle by a steering angle sensor; detecting a lateral acceleration by a lateral acceleration sensor; and determining counter steer according to the steering angle detected by the steering angle sensor and the lateral acceleration detected by the lateral acceleration sensor on the basis of a counter steer determination area table indicating whether or not the counter steer is on in relation to the combination of steering angle and lateral acceleration; the counter steer determination area table indicating at least one of a first area where the direction of turn indicated by the steering angle is opposite to the direction of turn indicated by the lateral acceleration and a second area where the direction of turn indicated by the steering angle is the same as the direction of turn indicated by the lateral acceleration; the first area being defined outside the counter steer determination area near a point where the steering angle is 0 and the lateral acceleration is 0; the second area being defined inside the counter steer determination area where the lateral acceleration is larger than a boundary value increasing in absolute value from a first predetermined value greater than 0 at a steering angle of 0 with an increase in absolute value of the steering angle.

According to the present invention, the counter steer determination area table indicates that the first area where the direction of turn indicated by the steering angle is opposite to the direction of turn indicated by the lateral acceleration is defined outside the counter steer determination area near a point where the steering angle is 0 and the lateral acceleration is 0. In the first area, the sign of the steering angle becomes momentarily different from the sign of the lateral acceleration because of delay characteristics of the vehicle and the lateral acceleration sensor in slalom running or the like. However, it is determined that the counter steer is off in this first area, thereby preventing improper determination of the counter steer.

Further, the counter steer determination area table indicates that the second area where the direction of turn indicated by the steering angle is the same as the direction of turn indicated by the lateral acceleration is defined inside the counter steer determination area where the lateral acceleration is larger than a boundary value increasing in absolute value from a first predetermined value greater than 0 at a steering angle of 0 with an increase in absolute value of the steering angle. Accordingly, when the direction of steer becomes opposite to the direction of turn of the vehicle and the lateral acceleration remarkably delays in response to the steering angle, it is determined that the counter steer is on in this second area, so that the counter steer can be early detected.

Preferably, further including the step of detecting a vehicle speed by a vehicle speed sensor; the counter steer determination area table being either one of a plurality of tables prepared on the basis of a plurality of vehicle speeds and selectively used according to the vehicle speed detected by the vehicle speed sensor or a predetermined table using a corrected steering angle obtained by correcting the steering angle detected by the steering angle sensor with a correction coefficient according to the vehicle speed detected by the vehicle speed sensor.

The accuracy of determination of the counter steer can be improved by increasing the number of tables in the case that the tables are selectively used according to the vehicle speed detected by the vehicle speed sensor. On the other hand, in the case that the predetermined table using a corrected steering angle obtained by correcting the steering angle detected by the steering angle sensor with a correction coefficient according to the vehicle speed detected by the vehicle speed sensor is adopted as the counter steer determination area table, the table can be easily prepared and the counter steer can be accurately detected.

Preferably, the step of determining the counter steer includes the step of determining that the counter steer is on when the combination of the steering angle detected by the steering angle sensor and the lateral acceleration detected by the lateral acceleration sensor stays inside the counter steer determination area for a predetermined time period from the off state of the counter steer.

When the combination of the steering angle detected by the steering angle sensor and the lateral acceleration detected by the lateral acceleration sensor stays inside the counter steer determination area for a predetermined time period, the on state of the counter steer is determined. Accordingly, it is possible to prevent improper determination due to sensor noise or the like and hunting of counter steer detection/cancellation.

Preferably, the step of determining the counter steer includes the step of determining that the counter steer is off when the combination of the steering angle detected by the steering angle sensor and the lateral acceleration detected by the lateral acceleration sensor stays outside the counter steer determination area for a predetermined time period from the on state of the counter steer.

When the combination of the steering angle detected by the steering angle sensor and the lateral acceleration detected by the lateral acceleration sensor stays outside the counter steer determination area for a predetermined time period, the off state of the counter steer is determined. Accordingly, it is possible to prevent improper determination due to sensor noise or the like and hunting of counter steer detection/cancellation.

The above and other objects, features and advantages of the present invention as well as the manner of realizing them will become more apparent whereas the invention itself will best understood from a careful study of the following description and appended claims with reference to attached drawings showing some preferred embodiments of the invention.

DETAILED DESCRIPTION OF THE PREFERRED EMBODIMENTS

Figure 1:
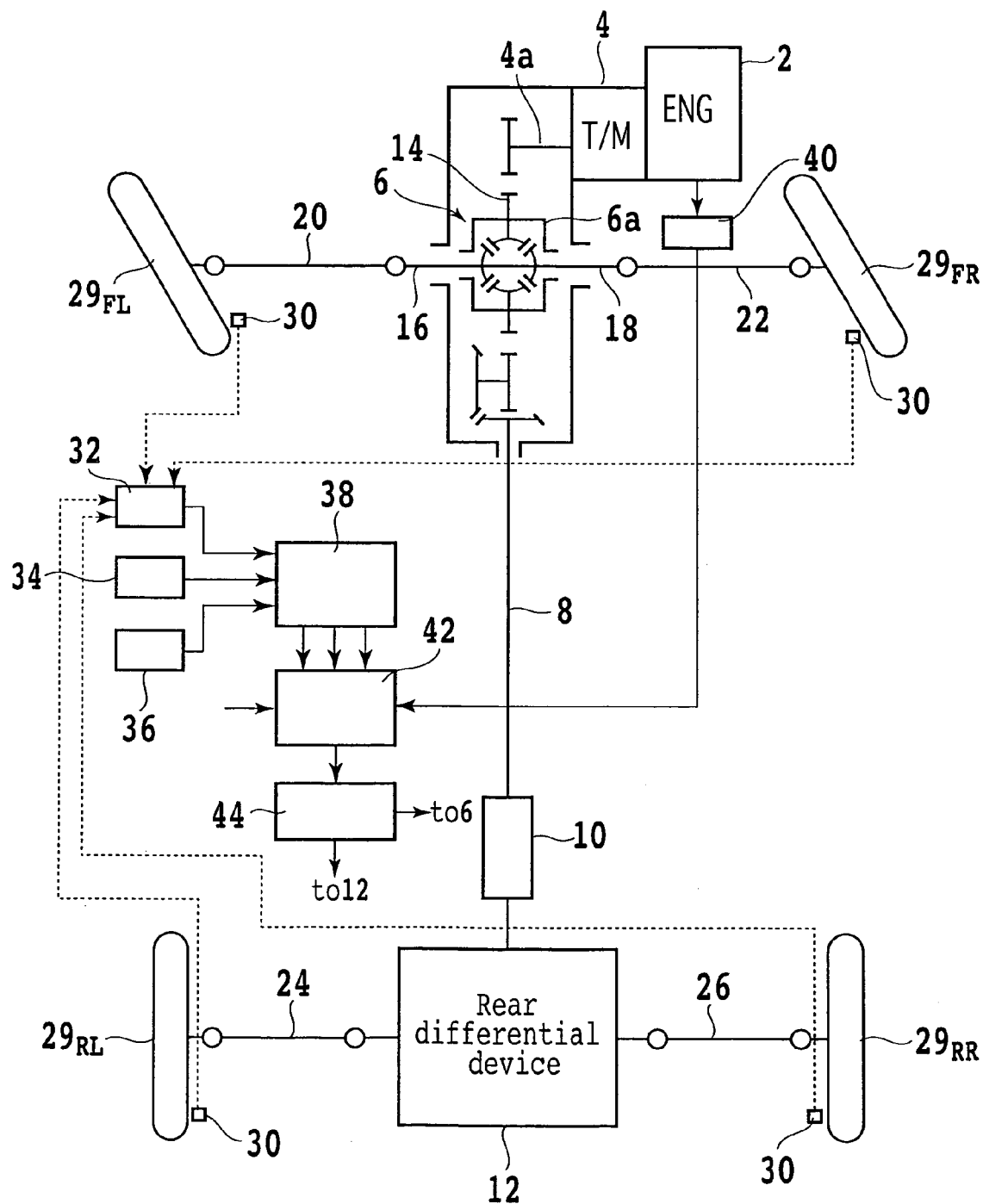
FIG. 1 is a schematic diagram showing a power transmitting system for a four-wheel drive vehicle.

FIG. 1 is a schematic diagram of a power transmitting system for a four-wheel drive vehicle based on a front-engine front-drive (FF) vehicle to which the counter steer detecting method of the present invention is applicable. As shown in FIG. 1, the power transmitting system mainly includes a front differential device 6 to which the power of an engine 2 located at a front portion of the vehicle is transmitted from an output shaft 4a of a transmission 4, a speed increasing device (speed changing device) 10 to which the power from the front differential device 6 is transmitted through a propeller shaft 8 extending in the longitudinal direction of the vehicle, and a rear differential device 12 to which the power from the speed increasing device 10 is transmitted.

The front differential device 6 has a structure well known in the art, and the power from the output shaft 4a of the transmission 4 is transmitted through a plurality of gears 14 and output shafts 16 and 18 in a differential case 6a to left and right front wheel drive shafts 20 and 22, thereby driving left and right front wheels $29_{FL}$ and $29_{FR}$. Torque control for the front wheels $29_{FL}$ and $29_{FR}$ is performed by electromagnetic actuators, for example.

The rear differential device 12 includes a pair of planetary gear sets and a pair of electromagnetic actuators for controlling the engagement of multiplate brake mechanisms (multiplate clutch mechanisms). The electromagnetic actuators in the rear differential device 12 are controlled to transmit the power to left and right rear wheel drive shafts 24 and 26, thereby driving left and right rear wheels $29_{RL}$ and $29_{RR}$.

A plurality of wheel speed sensors 30 are provided for the front wheels $29_{FL}$ and $29_{FR}$ and the rear wheels $29_{RL}$ and $29_{RR}$, respectively, to detect the rotational speeds of these wheels. A vehicle speed sensor 32 is provided to detect a vehicle speed V according to the wheel speeds detected by the wheel speed sensors 30 and to output an electrical signal, e.g., a voltage level corresponding to the vehicle speed V.

A steering angle sensor 34 includes a rotary encoder provided on a steering shaft, for example, and outputs an electrical signal corresponding to the direction and magnitude of a steering angle input from an operator, e.g., a voltage signal indicating a sign and a level. A lateral G sensor 36 is provided to detect a lateral acceleration $G_y$ as an acceleration applied to the vehicle in its lateral direction and to output an electrical signal, e.g., a voltage signal corresponding to the magnitude of the detected lateral acceleration. An engine ECU 40 is provided to calculate a drive torque according to the rotational speed of the engine 2, for example.

Figure 2:
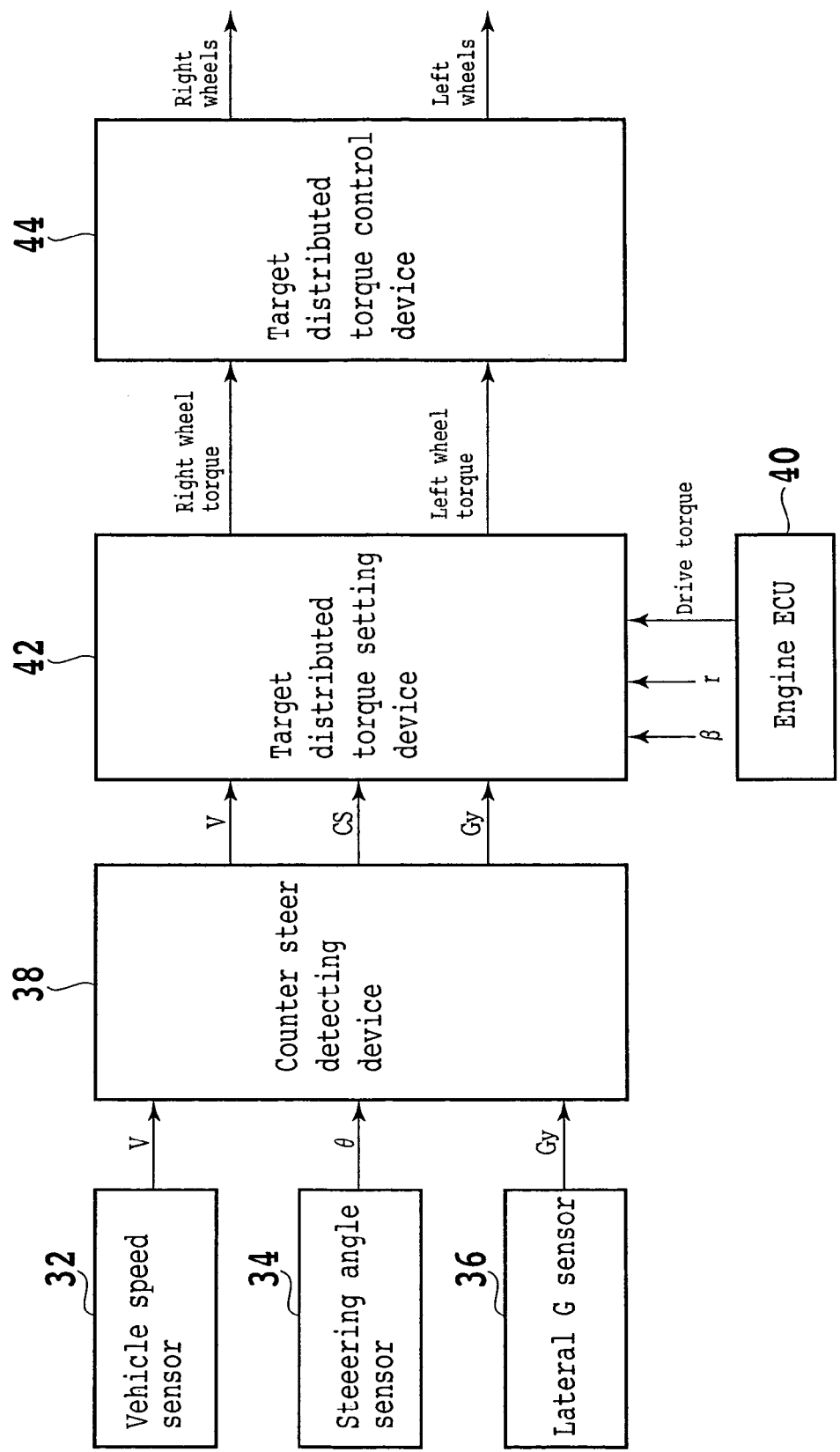
FIG. 2 is a block diagram relating to the control of a motional condition of the vehicle.

FIG. 2 is a block diagram of a system relating to the control of a notional condition of the vehicle. A counter steer detecting device 38 is provided to determine counter steer according to a steering angle detected by the steering angle sensor 34, a lateral G detected by the lateral G sensor 36, and a vehicle speed V detected by the vehicle speed sensor 32 on the basis of a counter steer determination area table indicating whether or not the counter steer is on in relation to the combination of steering angle, lateral G, and vehicle speed, as will be hereinafter described, then outputting a signal CS indicating whether or not the counter steer is on.

A target distributed torque setting device 42 is provided to set target values for the torque to be distributed to the right and left front wheels $29_{FR}$ and $29_{FL}$ and the right and left rear wheels $29_{RR}$ and $29_{RL}$ according to a signal CS indicating whether or not the counter steer is on, a slip angle β estimated by a slip angle estimating device (not shown), which slip angle β is an angle formed between a running direction of the vehicle and the propeller shaft 8 extending in the longitudinal direction of the vehicle, a yaw rate r detected by a yaw rate sensor (not shown), a lateral G detected by the lateral G sensor 36, a vehicle speed V detected by the vehicle speed sensor 32, and a drive torque calculated in the engine ECU 40, then outputting the target torque values to be distributed to the wheels $29_{FR}$, $29_{FL}$, $29_{RR}$, and $29_{RL}$ to a target distributed torque control device 44.

The target distributed torque control device 44 controls currents to be supplied to the electromagnetic actuators respectively provided for the wheels $29_{FR}$, $29_{FL}$, $29_{RR}$, and $29_{RL}$ according to the target torque values output from the target distributed torque setting device 42.

Figure 3:
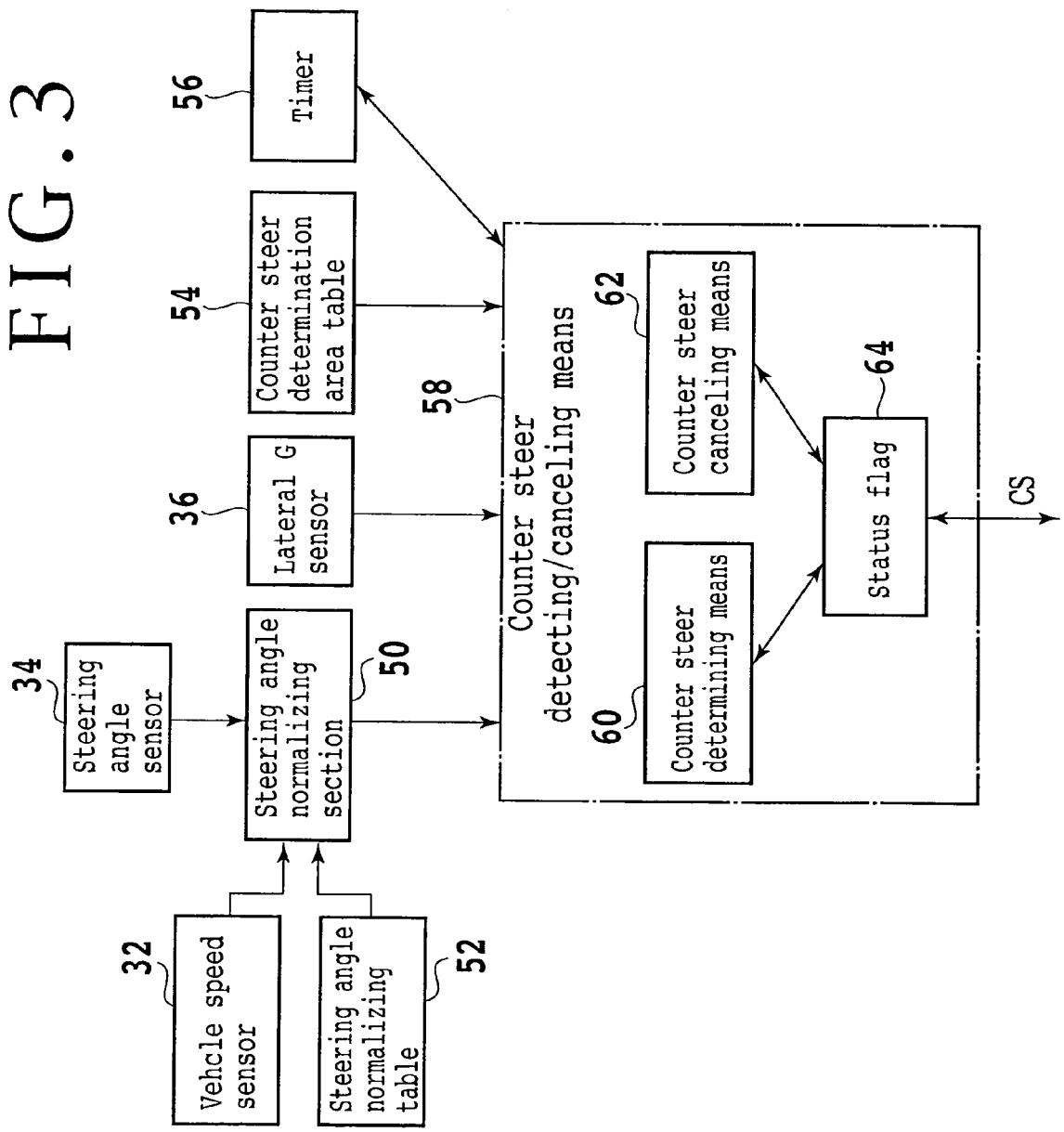
FIG. 3 is a block diagram showing a counter steer detecting device according to a preferred embodiment of the present invention.

FIG. 3 is a block diagram showing a preferred embodiment of the counter steer detecting device 38. The counter steer detecting device 38 includes a steering angle normalizing section 50, a steering angle normalizing table 52, a counter steer determination area table 54, a timer 56, and counter steer detecting/canceling means 58.

The steering angle normalizing section 50 is provided to normalize a steering angle detected by the steering angle sensor 34 by obtaining a correction coefficient according to a vehicle speed V with reference to the steering angle normalizing table 52 and correcting the steering angle with this correction coefficient, e.g., by multiplying the steering angle by this correction coefficient. The reason for this normalization of the steering angle is that the lateral G detected by the lateral G sensor 36 increases with an increase in vehicle speed V even when the steering angle is fixed and that the dependence of the lateral G upon the vehicle speed V is therefore to be removed. For example, the correction coefficient is defined as the ratio of a steering angle $\theta_v$ at a vehicle speed V to a steering angle $\theta_{REF}$ at a reference vehicle speed $V_{REF}$ with a lateral acceleration $G_v$ at the vehicle speed V being fixed.

Figure 4:
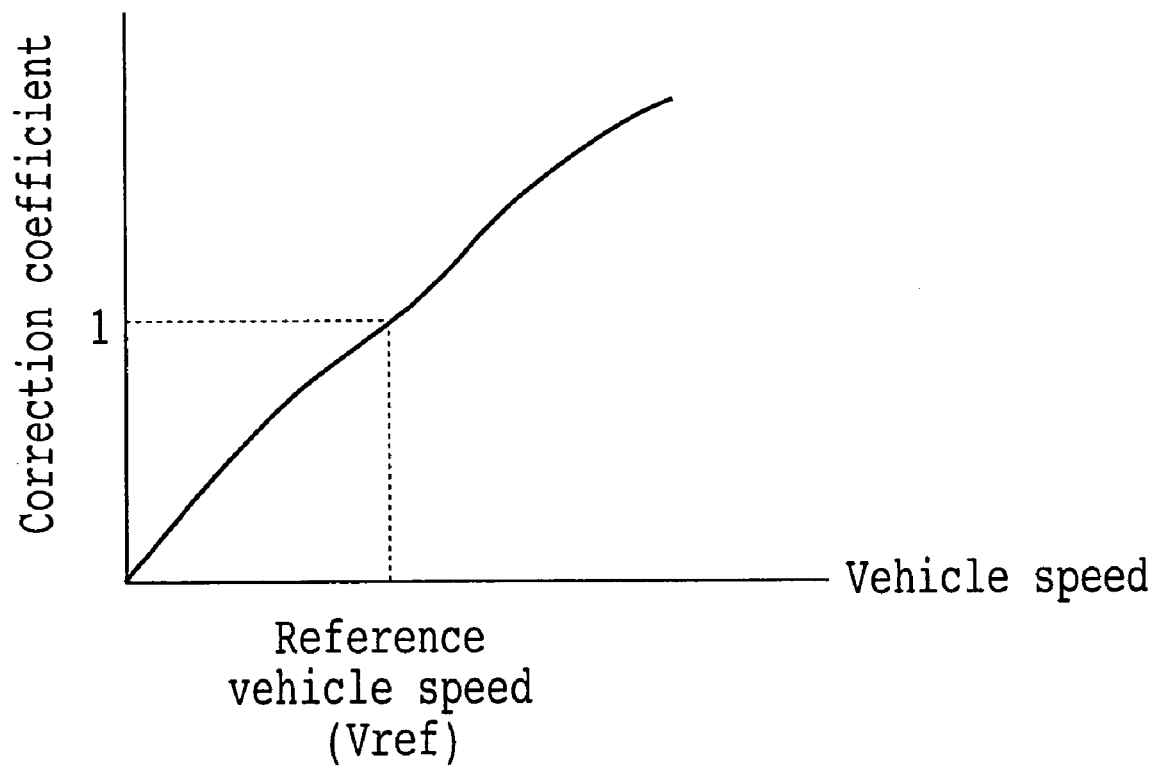
FIG. 4 is a graph showing a steering angle normalizing table.

FIG. 4 is a graph showing the steering angle normalizing table 52. In FIG. 4, the horizontal axis represents vehicle speed and the vertical axis represents correction coefficient. As shown in FIG. 4, the correction coefficient corresponding to the reference vehicle speed $V_{REF}$ is set to 1, and various other values for the correction coefficient corresponding to various other values for the vehicle speed are stored in the steering angle normalizing table 52. The correction coefficient is a monotone increasing function of vehicle speed because the lateral G increases with an increase in vehicle speed even when the steering angle is fixed.

Figure 5:
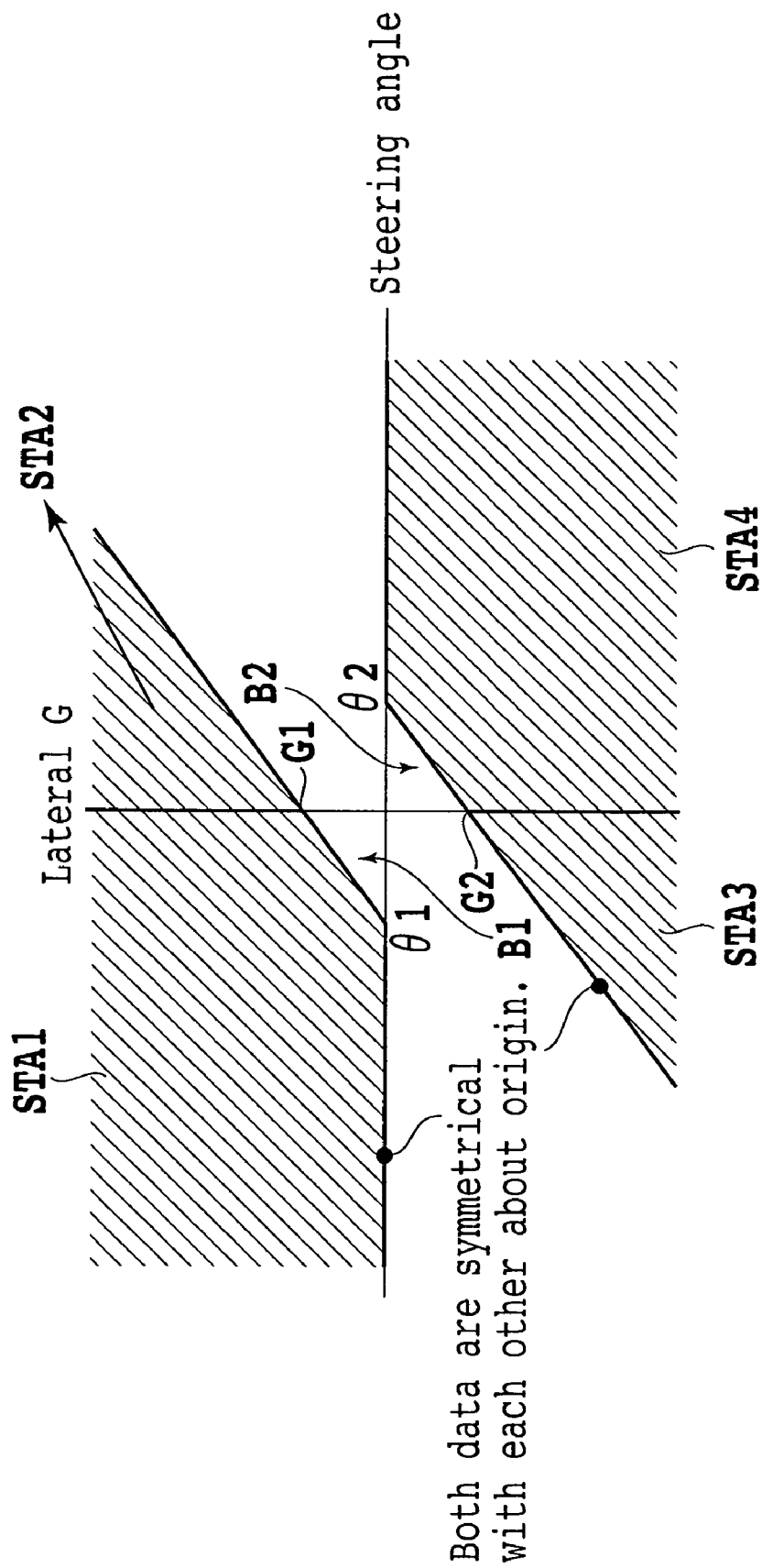
FIG. 5 is a graph showing a counter steer determination area table.

FIG. 5 is a graph showing the counter steer determination area table 54. In FIG. 5, the horizontal axis represents steering angle at the reference vehicle speed $V_{REF}$ (i.e., normalized steering angle, which will be hereinafter referred to simply as steering angle), and the vertical axis represents lateral G. The steering angle takes on 0 at a neutral position of the steering wheel, takes on positive values when the steering wheel is turned to the right, and takes on negative values when the steering wheel is turned to the left. The lateral G takes on positive values when the vehicle is turned to the right and takes on negative values when the vehicle is turned to the left.

In FIG. 5, the hatched area represents a counter steer determination area, which is composed of four areas STA1, STA2, STA3, and STA4. The area STA1 is an area where the lateral G is positive and the steering angle is negative. However, an area B1 near a point (origin) where the steering angle is 0 and the lateral G is 0 is excepted from the counter steer determination area. For example, the area B1 is an area surrounded by the horizontal axis, the vertical axis, and the straight line connecting the coordinates (0, G1) and (θ1, 0) where G1 is a first predetermined value (G1>0) and θ1 is a second predetermined value (θ1<0).

The reason for exception of the area B1 from the counter steer determination area is that the lateral G delays from the steering angle in repeating the turn of the steering wheel to the right and left such as in slalom running, thus causing a difference in sign between the steering angle and the lateral G. In this case, however, no counter steer occurs. While the boundary of the area B1 is composed of the vertical axis, the horizontal axis and the straight line connecting the coordinates (0, G1) and (θ1, 0) in this preferred embodiment, the boundary of the area B1 may be provided by a curved line.

The area STA2 is an area where the lateral G and the steering angle are positive and the lateral G is larger than a boundary value increasing in absolute value from the first predetermined value G1 greater than 0 at a steering angle of 0 with an increase in absolute value of the steering angle. For example, the area STA2 is an area surrounded by the vertical axis and an extension of the straight line connecting the coordinates (0, G1) and (θ1, 0).

In this area STA2, the trackability of the lateral G in response to the steering operation toward a steering angle of 0 is remarkably low, and it is determined that the counter steer is on. The reason for this determination is to avoid the delay of the detection of counter steer due to the fact that the counter steer cannot be detected until the turning direction of the steering wheel becomes opposite to that of the vehicle, and to early detect the counter steer. While the boundary of the area STA2 includes an extension of the straight line connecting the coordinates (0, G1) and (θ1, 0) in this preferred embodiment, this boundary line may be provided by a curved line.

Figure 6A:
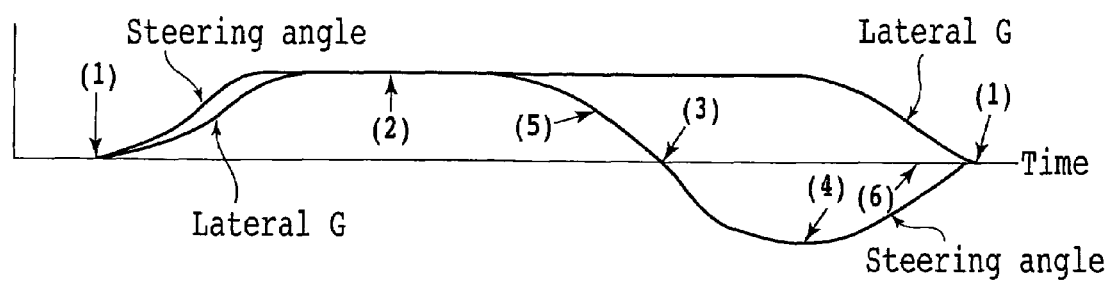
FIGS. 6A and 6B are graphs showing a counter steer determination area about some running data.
Figure 6B:
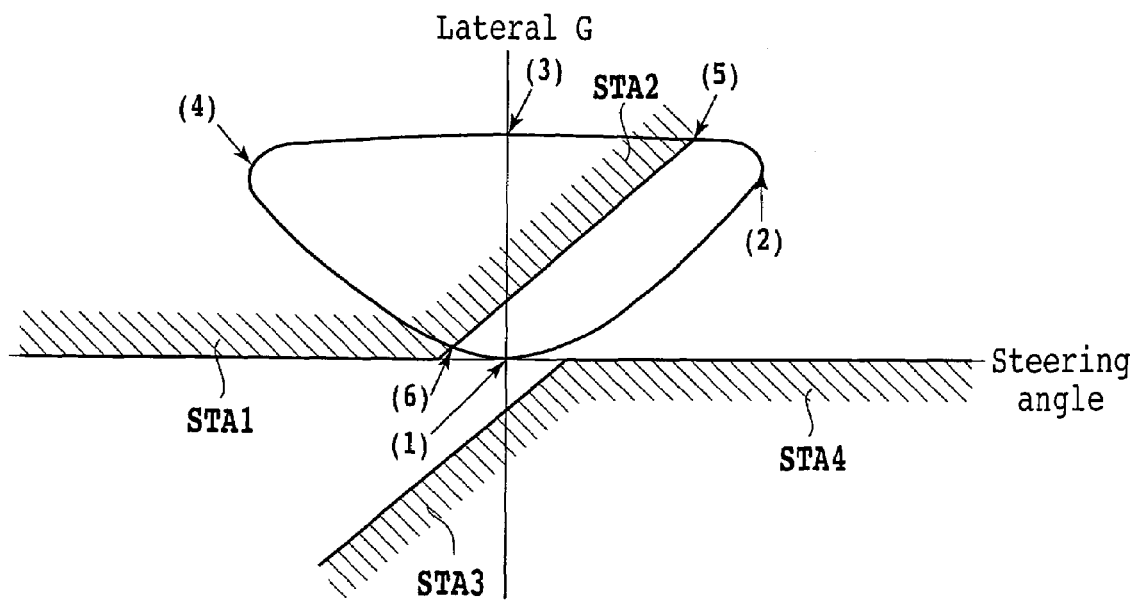

FIG. 6A is a graph showing lateral G and steering angle as running data, and FIG. 6B is a graph showing the relation between the running data and the counter steer determination area. As shown in FIG. 6A, the running data is data in the case that the steering wheel is first turned to the right and next turned to the left to restore the neutral position because the vehicle has been slipped to the right.

The numbers (1) to (6) shown in FIG. 6A respectively correspond to the numbers (1) to (6) shown in FIG. 6B. The condition ranging from the number (1) to the number (2) is a condition where the steering wheel is turned to the right to turn the vehicle to the right. The condition ranging from the number (2) to the number (3) is a condition where the steering wheel is turned to the left to restore the neutral position. The condition ranging from the number (3) to the number (4) is a condition where the steering wheel is turned to the left from the neutral position. The condition ranging from the number (4) to the number (1) is a condition where the steering wheel is turned to the right to restore the neutral position. In the condition shown by the number (5) between the numbers (2) and (3), the trackability of the lateral G in response to the steering operation toward a steering angle of 0 is remarkably low, and the point (5) lies on the boundary line of the counter steer determination area STA2. Further, in the condition shown by the number (6) between the numbers (4) and (1), the sign of the lateral G is different from that of the steering angle, and the point (6) does not present in the counter steer determination area, but lies on the boundary line of the area B1 outside the counter steer determination area.

The area STA3 shown in FIG. 5 is an area corresponding to the area STA2 in the case that the lateral G is negative. For example, the area STA3 is an area symmetrical to the area STA2 about the origin. Further, the area STA4 is an area corresponding to the area STA1 in the case that the lateral G is negative. For example, the area STA4 is an area symmetrical to the area STA1 about the origin.

The boundary of the area STA3 is composed of the vertical axis and an extension of the straight line connecting the coordinates (θ2, 0) and (0, G2) where (θ2=−θ1 and G2=−G1). The boundary of the area STA4 is composed of the vertical axis, the horizontal axis, and the straight line connecting the coordinates (θ2, 0) and (0, G2). An area B2 symmetrical to the area B1 about the origin is excepted from the area STA4 as in the case of the area STA1.

While the counter steer determination area table 54 is prepared on the basis of the reference vehicle speed $V_{REF}$ in this preferred embodiment, a plurality of such tables may be prepared on the basis of a plurality of vehicle speeds. In this case, the counter steer can be determined more precisely by increasing the number of tables to be prepared.

The timer 56 shown in FIG. 3 is used to determine the counter steer when the motional condition of the vehicle stays inside the counter steer determination area for a predetermined time period or more or to cancel the counter steer when the motional condition of the vehicle stays outside the counter steer determination area for a predetermined time period or more. The counter steer detecting/canceling means 58 shown in FIG. 3 includes counter steer determining means 60, counter steer canceling means 62, and a status flag 64.

Figure 7:
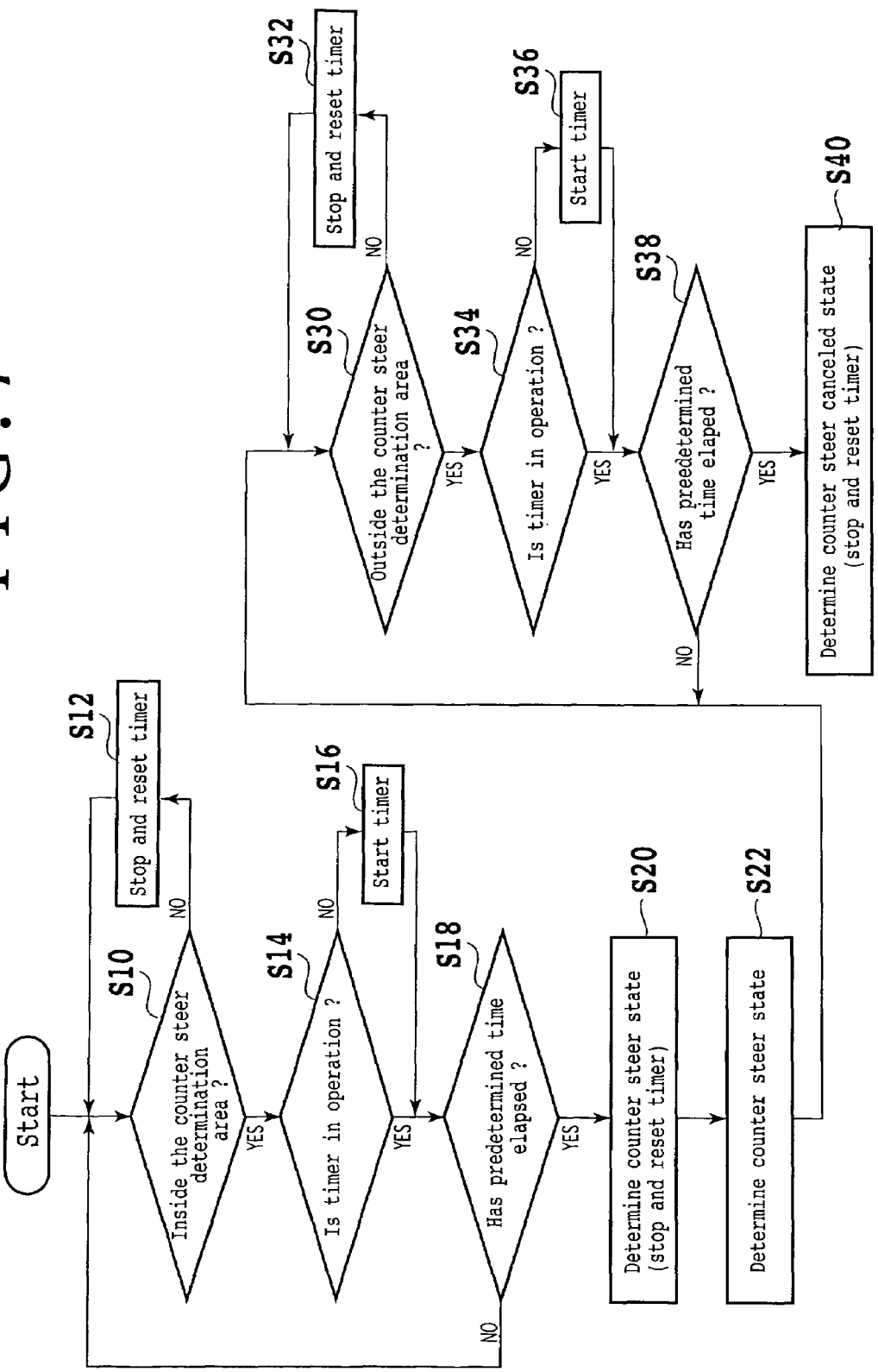
FIG. 7 is a flowchart showing a counter steer determining method and a counter steer canceling method.

FIG. 7 is a flowchart showing a counter steer detecting method according to the present invention. This method will now be described with reference to FIG. 7.

It is assumed that the steering angle has been normalized by the steering angle normalizing means 50 as mentioned above. In the case that the steering angle is not normalized, a plurality of tables each defining a counter steer determination area for the combination of steering angle and lateral G are prepared on the basis of a plurality of vehicle speeds as the counter steer determination area table 54. One of these tables for a vehicle speed nearest to the vehicle speed detected by the vehicle speed sensor 32 is retrieved, and it is then determined whether or not the combination of the steering angle detected by the steering angle sensor 36 and the lateral G detected by the lateral G sensor 34 stays inside the counter steer determination area with reference to the above retrieved table. A counter steer canceled state (off state) is set as an initial state in the status flag 64.

When a counter steer is canceled, in step S10, the counter steer determining means 60 refers to the counter steer determination area table 54 with the steering angle and the lateral G both detected, and determines whether or not the motional condition of the vehicle stays inside the counter steer determination area.

If the motional condition of the vehicle stays inside the counter steer determination area, the program proceeds to step S14, whereas if the motional condition of the vehicle does not stay inside the counter steer determination area, the program proceeds to step S12 to stop and reset the timer 56.

In step S14, the counter steer determining means 60 determines whether or not the timer 56 is in operation. If the timer 56 is in operation, the program proceeds to step S18, whereas if the timer 56 is not in operation, the program proceeds to step S16.

In step S16, the counter steer determining means 60 starts the timer 56. For example, the timer 56 is started at the point (5) shown in FIG. 6A or 6B. In step S18, the counter steer determining means 60 determines whether or not a predetermined time has elapsed after starting the timer 56. If the predetermined time has elapsed, the program proceeds to step S20, whereas if the predetermined time has not elapsed, the program returns to step S10.

In step S20, the counter steer determining means 60 determines that the counter steer is on, and sets the status flag 64 to a counter steer state. At the same time, the timer 56 is stopped and reset. Thus, if the motional condition of the vehicle stays inside the counter steer determination area for the predetermined time, the counter steer state is determined. Accordingly, it is possible to prevent improper determination due to sensor noise or the like and hunting of counter steer detection/cancellation.

For example, when the predetermined time has elapsed from the point (5) shown in FIG. 6A or 6B, the counter steer state is determined. Accordingly, the counter steer state is determined at the predetermined time elapsed from the point (5) rather than the point (3) shown in FIG. 6A or 6B, so that the counter steer can be early detected. In step S22, the counter steer state remains determined.

In step S30 subsequent to step S22, the counter steer canceling means 62 refers to the counter steer determination area table 54 with the steering angle and the lateral G both detected, and determines whether or not the motional condition of the vehicle stays outside the counter steer determination area. If the motional condition of the vehicle stays outside the counter steer determination area, the program proceeds to step S34, whereas if the motional condition of the vehicle does not stay outside the counter steer determination area, the program proceeds to step S32 to stop and reset the timer 56.

In step S34, the counter steer canceling means 62 determines whether or not the timer 56 is in operation. If the timer 56 is in operation, the program proceeds to step S38, whereas if the timer 56 is not in operation, the program proceeds to step S36.

In step S36, the counter steer canceling means 62 starts the timer 56. For example, the timer 56 is started at the point (6) shown in FIG. 6A or 6B. In step S38, the counter steer canceling means 62 determines whether or not a predetermined time has elapsed after starting the timer 56. If the predetermined time has elapsed, the program proceeds to step S40, whereas if the predetermined time has not elapsed, the program returns to step S30.

In step S40, the counter steer canceling means 62 determines that the counter steer is off, and sets the status flag 64 to a counter steer canceled state. At the same time, the timer 56 is stopped and reset. Thus, if the motional condition of the vehicle stays outside the counter steer determination area for the predetermined time, the counter steer canceled state is determined. Accordingly, it is possible to prevent improper determination due to sensor noise or the like and hunting of counter steer detection/cancellation.

For example, when the predetermined time has elapsed from the point (6) shown in FIG. 6A or 6B, the counter steer canceled state is determined. When the counter steer canceled state remains determined, steps S10 to S22 are repeated, whereas when the counter steer state remains determined, steps S30 to S40 are repeated.

As described above, the counter steer can be detected early and properly. According to the status flag indicating whether or not the counter steer is on, the slip angle β, the vehicle speed V, the lateral G, etc., target values for the torque to be distributed to the right and left front wheels $29_{FR}$ and $29_{FL}$ and the right and left rear wheels $29_{RR}$ and $29_{RL}$ are set by the target distributed torque setting device 42. Further, according to the target torque values output from the target distributed torque setting device 42, the currents to be passed through the electromagnetic actuators respectively provided for the wheels $29_{FR}$, $29_{FL}$, $29_{RR}$, and $29_{RL}$ are controlled by the target distributed torque control device 44 corresponding to the target torque values. Accordingly, the motional condition of the vehicle including the torque of each wheel can be well controlled according to the counter steer detected early and properly.

What is claimed is:

1. A counter steer detecting method comprising the steps of:

detecting a steering angle by a steering angle sensor;

detecting a lateral acceleration by a lateral acceleration sensor; and determining counter steer according to the steering angle detected by said steering angle sensor and the lateral acceleration detected by said lateral acceleration sensor on the basis of a counter steer determination area table indicating whether or not the counter steer is on in relation to the combination of steering angle and lateral acceleration;

said counter steer determination area table indicating at least one of a first area where the direction of turn indicated by the steering angle is opposite to the direction of turn indicated by the lateral acceleration and a second area where the direction of turn indicated by the steering angle is the same as the direction of turn indicated by the lateral acceleration;

said first area being defined outside the counter steer determination area near a point where the steering angle is 0 and the lateral acceleration is 0;

said second area being defined inside the counter steer determination area where the lateral acceleration is larger than a boundary value increasing in absolute value from a first predetermined value greater than 0 at a steering angle of 0 with an increase in absolute value of the steering angle; and further comprising the step of detecting a vehicle speed by a vehicle speed sensor;

said counter steer determination area table being either one of a plurality of tables prepared on the basis of a plurality of vehicle speeds and selectively used according to the vehicle speed detected by said vehicle speed sensor or a predetermined table using a corrected steering angle obtained by correcting the steering angle detected by said steering angle sensor with a correction coefficient according to the vehicle speed detected by said vehicle speed sensor;

further comprising the step of sending a signal indicating whether or not counter steer is on to a target distributed torclue setting device for adjusting torque distribution based on whether or not counter steer is on.

2. The counter steer detecting method according to claim 1, wherein said step of determining the counter steer comprises the step of determining that the counter steer is on when the combination of the steering angle detected by said steering angle sensor and the lateral acceleration detected by said lateral acceleration sensor stays inside the counter steer determination area for a predetermined time period from the off state of the counter steer.

3. The counter steer detecting method according to claim 1, wherein said step of determining the counter steer comprises the step of determining that the counter steer is off when the combination of the steering angle detected by said steering angle sensor and the lateral acceleration detected by said lateral acceleration sensor stays outside the counter steer determination area for a predetermined time period from the on state of the counter steer.

* * * * *